(12) United States Patent
Herrmann et al.

(10) Patent No.: US 9,176,238 B2
(45) Date of Patent: Nov. 3, 2015

(54) DETECTION DEVICE FOR DETECTING PHOTONS EMITTED BY A RADIATION SOURCE

(75) Inventors: Christoph Herrmann, Aachen (DE);
Roger Steadman Booker, Aachen (DE);
Oliver Muelhens, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 42 days.

(21) Appl. No.: 13/978,585

(22) PCT Filed: Dec. 27, 2011

(86) PCT No.: PCT/IB2011/055962
§ 371 (c)(1),
(2), (4) Date: Jul. 8, 2013

(87) PCT Pub. No.: WO2012/095710
PCT Pub. Date: Jul. 19, 2012

(65) Prior Publication Data
US 2013/0284940 A1    Oct. 31, 2013

(30) Foreign Application Priority Data
Jan. 10, 2011  (EP) ..................................... 11150461

(51) Int. Cl.
*G01T 1/17*  (2006.01)
(52) U.S. Cl.
CPC ........................................ *G01T 1/17* (2013.01)
(58) Field of Classification Search
CPC ............ G01T 1/208; G01T 7/005; G01T 1/17
USPC ........................................................ 250/393
See application file for complete search history.

(56) References Cited

U.S. PATENT DOCUMENTS 3,887,473 A * 6/1975 Sternberg et al. ............. 250/345
4,125,812 A   11/1978 Polonio
(Continued)

FOREIGN PATENT DOCUMENTS

WO    2005121988 A2    12/2005
WO    2009155198 A1    12/2009

OTHER PUBLICATIONS

Gawelda, W., et al.; Ultrafast X-ray Spectroscopy for Structural Dynamics Studies in Chemistry and Biology; 2007; Proc. of SPIE; vol. 6727; 7 pages.
(Continued)

*Primary Examiner* — Marcus Taningco

(57) ABSTRACT

The invention relates to a detection device (6) for detecting photons emitted by a radiation source (2). A signal generation unit (20) generates a detection signal indicative of the energy of a detected photon while photons strike the detection device (6), and a baseline signal, which is affected by photons that previously struck the detection device (6), while photons are prevented from striking the detection device (6). A baseline shift determination unit (40) determines a baseline shift of the detection signal depending on the baseline signal. An energy determination unit (30) determines the energy of a detected photon depending on the detection signal and the determined baseline shift. Since the baseline shift of the detection signal is determined from a baseline signal that is generated while photons are prevented from striking the detection device (6), the baseline shift can be determined with higher accuracy, resulting in an improved energy determination.

18 Claims, 5 Drawing Sheets

(56) References Cited

U.S. PATENT DOCUMENTS

| | | |
|---|---|---|
| 4,647,199 A | 3/1987 | Ferber et al. |
| 4,692,626 A | 9/1987 | Westphal |
| 5,646,408 A * | 7/1997 | Goldberg et al. ........ 250/363.07 |
| 6,903,344 B2 * | 6/2005 | Breeding et al. ......... 250/363.03 |
| 7,592,581 B2 | 9/2009 | Nakaya |
| 7,638,760 B1 | 12/2009 | Heipp et al. |
| 2004/0228451 A1 * | 11/2004 | Wu et al. ....................... 378/207 |
| 2010/0066426 A1 | 3/2010 | Schmand et al. |
| 2013/0284940 A1 * | 10/2013 | Herrmann et al. ............ 250/393 |

OTHER PUBLICATIONS

Ghioni, M., et al.; True constant fraction trigger circuit for picosecond photon-timing with ultrafast microchannel plate photomultipliers; 1997; Rev. Sci. Instrum.; 68(5)2228-2237.

* cited by examiner

DETECTION DEVICE FOR DETECTING PHOTONS EMITTED BY A RADIATION SOURCE

FIELD OF THE INVENTION

The invention relates to a detection device for detecting photons emitted by a radiation source as well as to a corresponding detection method. The invention relates further to an imaging system comprising the detection device as well as to a corresponding imaging method.

BACKGROUND OF THE INVENTION

US 2010/0066426 A1 discloses that alternating current (AC) capacitive coupling strategies are commonly used in the data acquisition (DAQ) signal paths of positron emission tomography (PET) systems using, for example, a scintillation crystal in optical communication with a plurality of photomultiplier tubes (PMTs) for sensing incident gamma rays. In such systems, the energy absorbed from a gamma ray interacting with the scintillation crystal is measured by integrating the photosensor current. This current represents the amount of light collected by the sensing PMTs. Because of the AC coupling, only the AC portion of the photosensor current is passed to the integrator while the direct current (DC) portion is effectively blocked by a coupling capacitor. This has the disadvantage of causing a count rate dependent baseline shift or wander in the integrated photosensor current signals, which, in turn, can lead to incorrect energy measurements. In order to mitigate these adverse effects, a baseline restoration circuit comprising a passive network is integrated into the DAQ signal path. However, this circuit may not always be able to sufficiently correct the baseline shift induced by the AC coupling.

SUMMARY OF THE INVENTION

It is an object of the present invention to provide a detection device and a detection method for detecting photons emitted by a radiation source, which allow for an improved baseline shift correction. It is a further object of the present invention to provide an imaging system, which comprises the detection device, as well as a corresponding imaging method.

In a first aspect of the present invention a detection device for detecting photons emitted by a radiation source is presented, the detection device comprising:

a signal generation unit for generating a detection signal indicative of the energy of a detected photon while photons strike the detection device, wherein the signal generation unit is adapted to generate a baseline signal while photons are prevented from striking the detection device, the baseline signal being affected by photons that previously struck the detection device, a baseline shift determination unit for determining a baseline shift of the detection signal, wherein the baseline shift determination unit is adapted to determine the baseline shift depending on the baseline signal, an energy determination unit for determining the energy of a detected photon depending on the detection signal and the determined baseline shift.

The invention is based on the idea that the current baseline shift of the detection signal is a phenomenon that generally depends on the characteristics (intensity, energy) of the irradiation of the detection device over a recent period of time. Phrased differently, the baseline shift of the detection signal generated by the signal generation unit upon the detection of a photon is generally affected by photons that previously struck the detection device, i.e., it depends on the previous "irradiation history". As such, the baseline shift represents lower frequency components of the detection signal, which vary or wander only slowly compared to the duration of the higher frequency components of the detection signal, which are due to the detection of individual photons. This holds true if the baseline shift results from the use of alternating current (AC) coupling for coupling the radiation sensitive elements of the detection device, e.g., a direct conversion sensor, such as a cadmium zinc telluride (CZT) based sensor, or a scintillator based sensor that includes a scintillator in optical communication with a photosensor, to the signal generation unit.

In addition, it also holds true if DC coupling is used between the radiation sensitive elements of the detection device and the signal generation unit, and the baseline shift is the result of other effects, such as "pile-up" effects, the appearance of a count rate dependent leakage current in the radiation sensitive elements, or a slowly decaying residual current in the radiation sensitive elements, which may originate when these elements are exposed to lower irradiation after being exposed to stronger irradiation for a longer period of time, e.g., multiple frame periods. The term "frame period" as used herein has the usual meaning of a time interval over which the detection device detects photons associated with a single frame.

By providing a detection device with a signal generation unit that is adapted to generate a baseline signal while photons are prevented from striking the detection device and a baseline shift determination unit that is adapted to determine the baseline shift depending on the baseline signal, the baseline shift can be determined from a "residual" signal, i.e., a signal that only comprises the lower frequency components of the baseline shift but not the higher frequency components that are due to the detection of individual photons. This allows for a more accurate determination of the baseline shift that is not impaired by the higher frequency components. This more accurately determined baseline shift can then be used by the energy determination unit for determining the energy of a detected photon depending on the detection signal and the determined baseline shift, resulting in an improved energy determination.

The detection device is preferably a photon counting detection device (also known as energy discriminating photon counting detection device), i.e., a detection device that energy discriminates the detected photons into one or more energy intervals and that provides for each energy interval a count representing the number of detected photons having an energy that falls into the respective energy interval. Such detection devices are used, for example, in medical imaging systems, such as medical computed tomography (CT) systems, medical positron emission tomography (PET) systems, or medical single photon emission computed tomography (SPECT) systems.

The signal generation unit is preferably a pulse signal generation unit generating a detection pulse signal having an amplitude that is indicative of the energy of a detected photon. A pulse signal generation unit can be implemented, for example, by a circuit comprising an integrating amplifier. Such an integrating amplifier generates a pulse signal by integrating an electrical signal, e.g., an electrical current or voltage signal, generated by the radiation sensitive elements of the detection device upon detection of a photon.

The energy determination unit is preferably an energy discrimination unit that energy discriminates the detected photons into one or more energy intervals such that for each energy interval a count representing the number of detected photons having an energy that falls into the respective energy interval can be provided by the detection device.

The radiation source can be, for example, an X-ray tube or a similar device, a source of gamma radiation, such as a gamma emitting radionuclide, or a positron emitting radionuclide. Preferably, the radiation source can be a poly-energetic radiation source, i.e., a radiation source that emits photons at two or more energy levels.

It is preferred that the detection device is adapted to be synchronizable with the irradiation by the radiation source such that the baseline shift determination unit determines the baseline shift during a baseline shift determination time interval during which the radiation source is prevented from irradiating the detection device.

By providing a detection device that is adapted to be synchronizable, i.e., it can be synchronized by a suitable synchronization unit, with the irradiation by the radiation source, it can be ensured that the baseline shift determination unit determines the baseline shift during a baseline shift determination time interval during which the radiation source is prevented from irradiating the detection device.

The synchronizability of the detection device is preferably realized by a suitable interface, such as an analog or digital interface, that allows to provide a suitable sychronization signal to the detection device.

It is further preferred that the detection device is adapted to be synchronizable with the irradiation by the radiation source such that the baseline shift determination time interval is located at the end of a frame period.

By locating the baseline shift determination time interval at the end of a frame period, the energy determination unit can determine the energy of detected photons during the next frame depending on the detection signal and a recently determined baseline shift, resulting in an improved energy determination.

The baseline shift determination time interval is preferably short compared to the frame period, e.g., about 1 to 2% of the frame period, so that the proportion of the frame period that remains for the detection of photons is not substantially reduced by the baseline shift determination.

It is preferred that the detection device is adapted to be synchronizable with the irradiation by the radiation source such that during a frame period the baseline shift determination unit determines the baseline shift during multiple baseline shift determination time intervals during which the radiation source is prevented from irradiating the detection device.

Even though the baseline shift represents lower frequency components of the detection signal—compared to the higher frequency components of the signal that are due to the detection of individual photons—, it will generally vary or wander over time depending on the irradiation of the detection device. Thus, the baseline shift determined during a certain baseline shift determination time interval may only provide a good estimate of the actual baseline shift for a limited period of time. By providing a detection device that is adapted to be synchronizable with the irradiation by the radiation source such that during a frame period the baseline shift determination unit determines the baseline shift during multiple baseline shift determination time intervals during which the radiation source is prevented from irradiating the detection device, the time interval between two subsequent baseline shift determinations can be reduced. This allows the energy determination unit to determine the energy of a detected photon depending on the detection signal and a more recently determined baseline shift, i.e., a baseline shift that is more up-to-date, resulting in an improved energy determination.

The multiple baseline shift determination time intervals are each preferably short compared to the frame period, e.g., about 1 to 2% of the frame period, so that even with multiple baseline shift determinations per frame period the proportion of the frame period that remains for the detection of photons is not substantially reduced.

It is further preferred that the detection device is adapted to be synchronizable with the irradiation by the radiation source such that the baseline shift measuring time interval is started when a flux of photons striking the detection device exceeds a predefined threshold.

The photon flux may be determined by counting the number of photons that struck the detection device within a frame period. For example, if the detection device is a photon counting detection device, the photon flux can be determined from the energy discriminated photon counts for the one or more energy intervals. Alternatively, if the detection device is both a photon counting and an integrating detection device, i.e., a detection device that can simultaneously count and integrate in each pixel, the photon flux may also be determined from the integrated radiation.

By starting the baseline shift measuring time interval when the photon flux exceeds a predefined threshold, it is possible to perform the baseline shift determination just in those situations where a substantive baseline shift can be expected.

It is preferred that the energy determination unit is adapted to correct the energy determination with respect to the determined baseline shift by removing the determined baseline shift from the detection signal.

By removing the determined baseline shift from the detection signal, the energy determination unit corrects the detection signal with respect to the baseline shift, yielding a "corrected" version of the detection signal. It then determines the energy of a detected photon from this "corrected" version of the detection signal, resulting in an improved energy determination. This approach to correcting the energy determination with respect to the determined baseline shift is particularly simple to implement.

It is further preferred that the energy determination unit is adapted to determine the energy of a detected photon by comparing the detection signal to one or more energy comparison values to which the determined baseline shift has been added in order to correct the energy determination with respect to the determined baseline shift.

If the energy determination unit determines the energy of a detected photon by comparing the detection signal to one or more energy comparison values, errors in the energy determination that result from the baseline shift of the detection signal can also be corrected by leaving the detection signal itself unchanged, but by changing instead the energy comparison values through addition of the determined baseline shift. This provides an alternative to the above-described approach to correcting the energy determination that also results in an improved energy determination.

If the signal generation unit is a pulse generation unit generating a pulse detection signal having an amplitude that is indicative of the energy of a detected photon, the energy comparison values are preferably energy thresholds.

It is preferred that the baseline shift determination unit comprises a sampling unit for sampling the baseline signal to generate a sampled value and an analog-to-digital converter unit for converting the sampled value to a digital value.

The baseline signal that is generated by the signal generation unit is typically an electrical signal, e.g., an electrical current or voltage signal. One way of determining the baseline shift from this electrical signal is therefore to sample the electrical signal using a sampling unit such as a sample-andhold circuit—and convert the sampled value to a digital value. This digital value may then directly provide a measurement of the required baseline shift, measured, e.g., in Ampere or Volt. Alternatively, if the signal generation unit generates an additional fixed signal offset, i.e., a signal offset that is independent from the irradiation of the detection device, that is equally apparent in both the detection signal and the baseline signal, the required baseline shift can be calculated from the digital value by subtracting the fixed signal offset.

It is further preferred that the detection device comprises a plurality of pixels, each pixel comprising the signal generation unit and the baseline shift determining unit, wherein for each pixel the baseline shift determination unit comprises a sampling unit for sampling the baseline signal to generate a sampled value, wherein the detection device comprises an analog-to-digital converter unit that is assigned to the sampling units of multiple pixels for sequentially converting the sampled values to digital values.

A typical detection device comprises a plurality of pixels, each pixel comprising the signal generation unit and the baseline shift determining unit (as well as the energy determination unit). In order to determine the baseline shift for all pixel for the same moment in time, it is therefore desirable that for each pixel the baseline shift determination unit comprises a sampling unit, so that the baseline signal can be sampled simultaneously in all pixels. The conversion of the sampled values to digital values, on the other hand, does not have to be performed simultaneously, but can also be done sequentially, i.e., in an interleaved way. Thus, a single analog-to-digital converter unit can be assigned to the sampling units of multiple pixels for sequentially converting the sampled values to digital values. This allows for a design of a detection device comprising multiple pixels that requires only a comparably small number of additional analog-to-digital converter units.

In another aspect of the present invention a detection method for detecting photons emitted by a radiation source by a detection device is presented, the detection method comprising:

generating a detection signal indicative of the energy of a detected photon while photons strike the detection device and a baseline signal while photons are prevented from striking the detection device, the baseline signal being affected by photons that previously struck the detection device, by a signal generation unit, determining a baseline shift of the detection signal depending on the baseline signal, by a baseline shift determination unit, determining the energy of a detected photon depending on the detection signal and the determined baseline shift, by an energy determination unit.

In another aspect of the present invention an imaging system is presented, the imaging system comprising:

a radiation source for emitting photons, a detection device for detecting photons emitted by the radiation source as defined in claim 1, a sychronization unit for synchronizing the detection device with the irradiation by the radiation source such that the baseline shift determination unit determines the baseline shift during a baseline shift determination time interval during which the radiation source is prevented from irradiating the detection device.

By providing an imaging system with a synchronization unit for synchronizing the detection device with the irradiation by the radiation source, it can be ensured that the baseline shift determination unit determines the baseline shift during a baseline shift determination time interval during which the radiation source is prevented from irradiating the detection device.

The imaging system is preferably a medical imaging system, such as a medical computed tomography (CT) system, a medical positron emission tomography (PET) system, or a medical single photon emission computed tomography (SPECT) system. Alternatively, the imaging system can also be an imaging system that is used, for example, for material inspection of technical and/or natural objects.

Depending on the type of imaging system, the radiation source can be, for example, an X-ray tube or a similar device, a source of gamma radiation, such as a gamma emitting radionuclide, or a positron emitting radionuclide. Preferably, the radiation source is a poly-energetic radiation source, i.e., a radiation source that emits photons at two or more energy levels.

It is preferred that the radiation source comprises a switching device for switching the emission of photons on and off, wherein the synchronization unit is adapted to provide a synchronization signal to the switching device such that during the baseline shift determination time interval the switching device is signaled to switch the emission of photons off.

If the radiation source allows for an active control of the photon emission, such as an X-ray tube or a similar device, the switching device is preferably a grid switch or the like. Such a grid switch, which, for example, for an X-ray tube may comprise an extra electrode located between the of the X-ray tube's cathode and anode to control the flow of electrons, allows for a very fast on and off switching of radiation source. It is therefore well suited to make sure that during the baseline shift determination time interval no photons are emitted by the radiation source. This, in turn, allows the ensure that the baseline shift determination unit really determines the baseline shift from a "residual" signal, i.e., a signal that only comprises the lower frequency components of the baseline shift but not the higher frequency components that are due to the detection of individual photons.

It is further preferred that the imaging system comprises a shielding device for shielding the radiation source, wherein the synchronization unit is adapted to provide a synchronization signal to the shielding device such that during the baseline shift determination time interval the shielding device is signaled to shield the radiation source from irradiating the detection device.

A shielding device is preferably used with radiation sources that do not allow for an active control of the photon emission, such as a gamma emitting radionuclide or a positron emitting radionuclide, but it may also be used with an X-ray tube or a similar device.

The shielding device is preferably a switched piece of metal or other material that is impermeable for the photons emitted by the radiation source. The switching device should ensure that during the baseline shift determination time interval no photons emitted by the radiation source strike the detection device. This, in turn, allows the ensure that the baseline shift determination unit really determines the baseline shift from a "residual" signal, i.e., a signal that only comprises the lower frequency components of the baseline shift but not the higher frequency components that are due to the detection of individual photons.

In another aspect of the present invention an imaging method is presented, the imaging method comprising:

emitting photons, by a radiation source, detecting photons emitted by the radiation source, by a detection method as defined in the claim 10, synchronizing the detection device with the irradiation by the radiation source such that the baseline shift determination unit determines the baseline shift during a baseline shift determination time interval during which the radiation source is prevented from irradiating the detection device, by a synchronization unit.

It shall be understood that the detection device of claim 1, the detection method of claim 10, the imaging system of claim 11 and the imaging method of claim 14 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
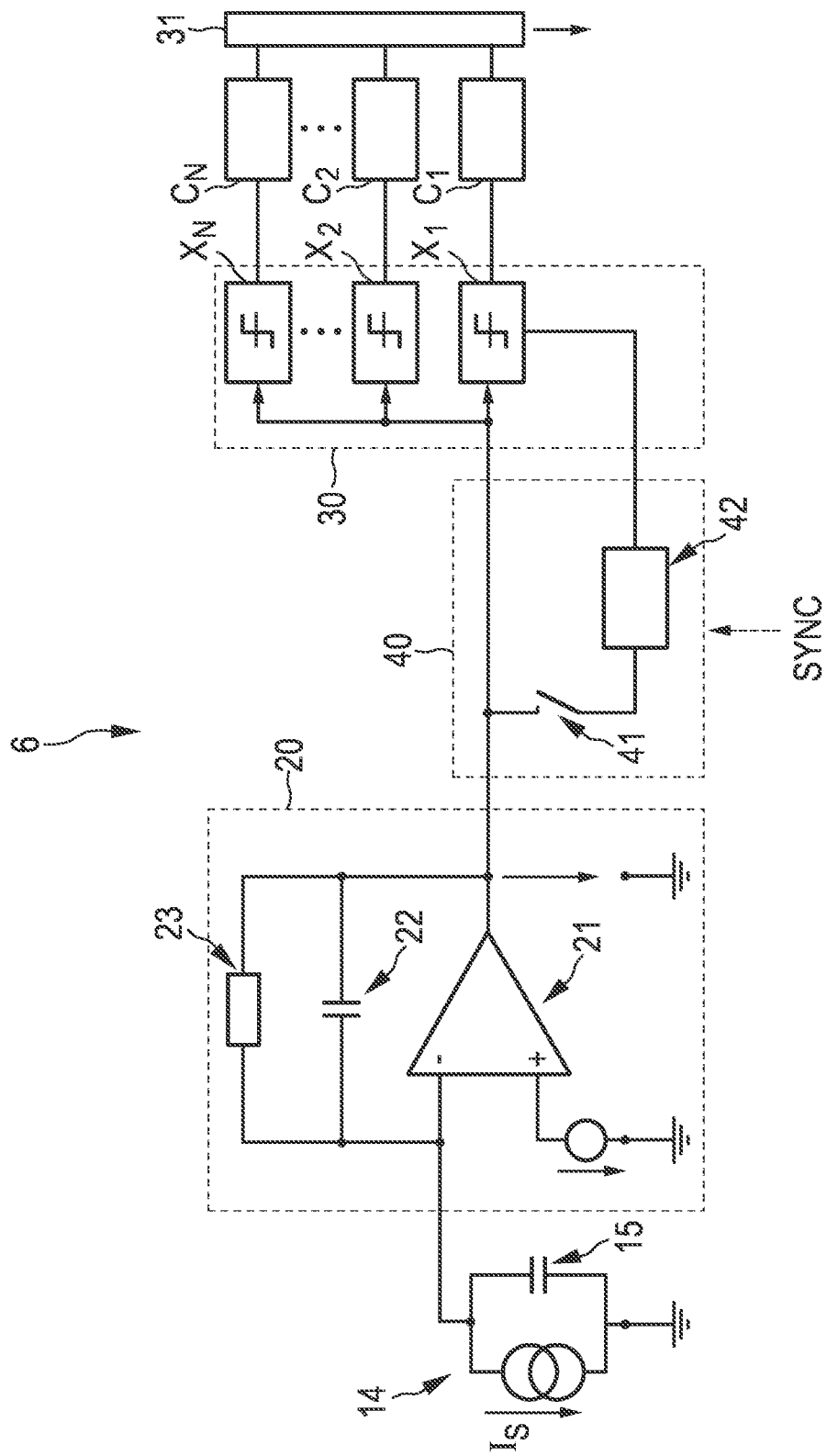
FIG. 1 shows schematically and exemplarily an embodiment of a detection device for detecting photons emitted by a radiation source.
Figure 3:
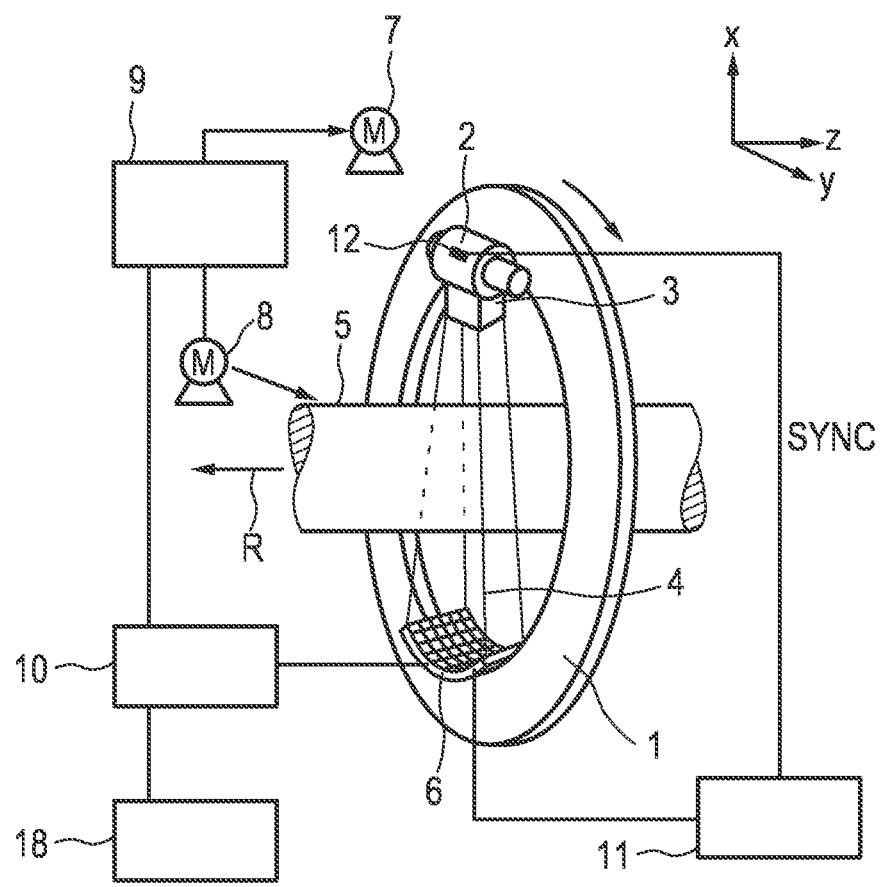
FIG. 3 shows schematically and exemplarily an embodiment of an imaging system.

FIG. 1 shows schematically and exemplarily an embodiment of a detection device 6 for detecting photons emitted by a radiation source 2, as shown, for example, with reference to FIG. 3. The detection device 6, which, in this embodiment, is a photon counting detection device, comprises a plurality of pixels each including a radiation sensitive sensor 14 (illustrated here with a sensor capacitance 15). The radiation sensitive sensor 14 of a pixel detects photons emitted by the radiation source 2 and generates a corresponding electrical signal, such as an electrical current or voltage signal, for each detected photon. Examples of suitable sensor types include direct conversion sensors, such as cadmium zinc telluride (CZT) based sensors, and scintillator based sensors that include a scintillator in optical communication with a photosensor. The electrical signal generated by the radiation sensitive sensor 14, in this embodiment, an electrical current signal $I_S$, is passed to a signal generation unit 20 of the pixel, which generates a detection signal, e.g., an electrical current or voltage signal, indicative of the energy of the detected photon. In this embodiment, the signal generation unit 20 is a pulse signal generation unit generating a detection pulse signal having an amplitude that is indicative of the energy of a detected photon.

The radiation sensitive sensor 14, in this embodiment, is DC (direct current) coupled to the pulse signal generation unit 20, resulting in both the DC and the AC (alternating current) portion of the electrical current signal $I_S$ being passed to the signal generation unit 20. In other embodiments, AC coupling can be used, which has the effect that only the AC portion of the electrical current signal $I_S$ is passed to the signal generation unit 20 while the DC portion is effectively blocked by a coupling capacitor.

The pulse signal generation unit 20, in this embodiment, is implemented as an integrating amplifier comprising an operational amplifier 21 and a feedback capacitor 22 with a resistor 23 connected in parallel to the feedback capacitor 22. The additional resistor 23, the resistance value of which can also depend on the voltage drop across the resistor, across the feedback capacitor 22 gives the circuit the characteristics of an inverting amplifier with finite closed-loop gain at very low frequencies while acting as an integrator at higher frequencies as the feedback capacitor 22 shorts out the resistance 23. In other embodiments, the pulse signal generation unit 20 may be composed of two stages (a first charge sensitive amplifier) and a second stage implementing the shaping functionality. In this case, the baseline sensing would preferably be at the output of the second stage.

The detection pulse signal generated by the pulse signal generation unit 20 is passed to an energy determination unit 30 of the pixel which determines the energy of the detected photon. In this embodiment, the energy determination unit 30 is implemented as an energy discriminator which energy-discriminates the detection pulse signal by comparing its amplitude to one or more energy thresholds $X_1, X_2, \ldots, X_N$. If the detection pulse signal exceeds a respective energy threshold $X_1, X_2, \ldots, X_N$, a corresponding counter $C_1, C_2, \ldots, C_N$ is incremented and, at the end of a frame period, the number of counts corresponding to each respective energy interval is read-out from the counters $C_1, C_2, \ldots, C_N$ via read-out line 31.

As already mentioned above, in this embodiment, the detection device 6 uses DC coupling of the radiation sensitive sensor 14 and the pulse signal generation unit 20, resulting in both the DC and the AC portion of the electrical current signal $I_S$ being passed to the pulse signal generation unit 20. In this case, a baseline shift of the detection pulse signal may occur under stronger radiation due to "pile-up" effects, i.e., when the flux of photons impinging on the radiation sensitive sensor 14 is so high that the individual electrical current signals $I_S$ generated by the radiation sensitive sensor 14 upon the detection of two or more photons overlap and, therefore, cause a pedestal or baseline shift of the electrical signal that is passed to the pulse signal generation unit 20.

In addition, the detection device 6 may exhibit a leakage current, which, in the case of the present DC coupling, can also result in a baseline shift of the detection pulse signal.

Moreover, if a pixel of the detection device 6 is exposed to lower irradiation after being exposed to stronger irradiation for a longer period of time, e.g., multiple frame periods, there can be some slowly decaying residual current originating from that pixel—this is similar to the afterglow of a scintillator—, which, in the case of the present DC coupling, can also lead to a baseline shift of the detection pulse signal.

Thus, in this embodiment of the detection device 6, which uses DC coupling of the radiation sensitive sensor 14 and the pulse signal generation unit 20, the above-described effects can result in a count rate dependent baseline shift of the detection pulse signal, which, in turn, can adversely affect the energy determination by the energy determination unit 30.

A similar behavior may also be experienced in embodiments of the detection device 6 that use AC coupling of the radiation sensitive sensor 14 and the pulse signal generation unit 20, which has the effect that only the AC portion of the electrical current signal $I_S$ is passed to the pulse signal generation unit 20 while the DC portion is effectively blocked by a coupling capacitor. Because the AC coupling enforces an average current of zero, i.e., the total charge integral across the coupling capacitor remains zero, the electrical signal that is passed to the pulse signal generation unit 20 has a baseline that is shifted downwards, resulting in a corresponding baseline shift of the detection pulse signal.

Moreover, because the DC portion of the electrical current signal $I_S$ depends on the count rate, i.e., the frequency with which photons impinge on the radiation sensitive sensor 14, the baseline of the electrical signal that is passed to the pulse signal generation unit 20, and, correspondingly, the baseline shift of the detection pulse signal, is generally not constant but will change or wander in count rate variant conditions.

Thus, also in the case of embodiments of the detection device 6 that use AC coupling of the radiation sensitive sensor 14 and the pulse signal generation unit 20, the above-described effects can result in a count rate dependent baseline shift of the detection pulse signal, which, in turn, can adversely affect the energy determination by the energy determination unit 30.

As should have become clear by now, the pulse signal generating unit 20 of the detection device 6 generates a detection pulse signal indicative of the energy of a detected photon while photons strike the detection device 6. The detection pulse signal may exhibit a baseline shift due to one of the above-described effects that generally depends on the characteristics, e.g., the intensity and/or the energy, of the irradiation of the detection device 6 over a recent period time. Phrased differently, the baseline shift of the detection pulse signal generated by the pulse signal generation unit 20 upon the detection of a photon is generally affected by photons that previously struck the detection device, i.e., it depends on the previous "irradiation history". As such, the baseline shift represents lower frequency components of the detection pulse signal, which vary or wander only slowly compared to the duration of the higher frequency components of the detection signal, which are due to the detection of individual photons.

For this reason, the baseline shift will also still be present in a baseline signal that is generated by the pulse signal generation unit 20 while photons are prevented from striking the detection device 6.

It is now foreseen that the detection device 6 comprises a baseline shift determination unit 40 that determines the baseline shift of the detection pulse signal depending on the baseline signal, and that the energy determination unit 30 determines the energy of a detected photon based on the detection pulse signal and the determined baseline shift. By doing so, the baseline shift can be determined from a "residual" signal, i.e., a signal that only comprises the lower frequency components of the baseline shift but not the higher frequency components that are due to the detection of individual photons. This allows for a more accurate determination of the baseline shift that is not impaired by the higher frequency components. This more accurately determined baseline shift is then used by the energy determination unit 30 for determining the energy of a detected photon depending on the detection pulse signal and the determined baseline shift, resulting in an improved energy determination, e.g. by adjusting the reference voltages of the discriminators X1, X2, . . . XN based on the measured baseline shift.

The detection device 6, in this embodiment, is adapted to be synchronizable with the irradiation by the radiation source 2 such that the baseline shift determination unit 40 determines the baseline shift during a baseline shift determination time interval during which the radiation source 2 is prevented from irradiating the detection device 6. The synchronizability of the detection device 6 is realized, in this embodiment, by a suitable interface, such as an analog or digital interface, that allows to provide a suitable sychronization signal SYNC to the detection device 6.

The detection device 6 is adapted to be synchronizable with the irradiation by the radiation source such that the baseline shift determination time interval is located at the end of a frame period.

The baseline shift determination time interval, in this embodiment, is short compared to the frame period, e.g., about 1 to 2% of the frame period, so that the proportion of the frame period that remains for the detection of photons is not substantially reduced by the baseline shift determination.

Additionally or alternatively, the detection device 6 can be adapted to be synchronizable with the irradiation by the radiation source 2 such that during a frame period the baseline shift determination unit determines the baseline shift during multiple baseline shift determination time intervals during which the radiation source 2 is prevented from irradiating the detection device 6.

Moreover, the detection device 6 can also be adapted to be synchronizable with the irradiation by the radiation source 2 such that the baseline shift measuring time interval is started when a flux of photons striking the detection device 2 exceeds a threshold.

The baseline shift determination unit 40 of a pixel, in this embodiment, comprises a sampling unit 41 for sampling the baseline signal to generate a sampled value and an analog-to-digital converter unit 42 for converting the sampled value to a digital value. The baseline signal that is generated by the pulse signal generation unit 20 is, in this embodiment, an electrical signal, e.g., an electrical current or voltage signal. In order to determine the baseline shift from this electrical signal, the electrical signal is sampled using a sampling unit such as, in this embodiment, a sample-and-hold circuit and converted to a digital value. This digital value does then directly provide a measurement of the required baseline shift, measured, e.g., in Ampere or Volt.

In other embodiments, in which the pulse signal generation unit 20 generates an additional fixed signal offset, i.e., a signal offset that is independent from the irradiation of the detection device 6, that is equally apparent in both the detection pulse signal and the baseline signal, the required baseline shift may be calculated from the digital value by subtracting the fixed signal offset.

In an alternative embodiment, the baseline shift determination unit 40 of each pixel comprises a sampling unit 41 and the baseline signal is sampled simultaneously in all pixels. Because the conversion of the sampled values to digital values, on the other hand, does not have to be performed simultaneously, but can also be done sequentially, i.e., in an interleaved way, a single analog-to-digital converter unit 42 is assigned to the sampling units 41 of multiple pixels for sequentially converting the sampled values to digital values.

The energy determination unit 30, in this embodiment, is adapted to correct the energy determination with respect to the determined baseline shift by removing the determined baseline shift from the detection pulse signal. In detail, the energy determination unit 30 corrects the detection pulse signal with respect to the baseline shift, yielding a "corrected" version of the detection pulse signal. It then determines the energy of a detected photon from this "corrected" version of the detection pulse signal, resulting in an improved energy determination.

In another embodiment, the energy determination unit 30 corrects errors in the energy determination that result from the baseline shift of the detection pulse signal by leaving the detection pulse signal itself unchanged, but by changing instead the energy comparison values through addition of the determined baseline shift.

Both the above-described approaches for correcting the determination of the energy of a detected photon result in an improved energy determination.

Figure 2:
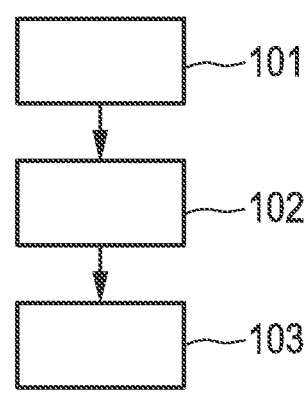
FIG. 2 shows exemplarily a flowchart illustrating an embodiment of a detection method for detecting photons emitted by a radiation source by a detection device.

FIG. 2 shows exemplarily a flowchart illustrating an embodiment of a detection method for detecting photons emitted by a radiation source 2 by a detection device 6. In step 101, a signal generation unit 20 generates a detection signal indicative of the energy of a detected photon while photons strike the detection device 6 and a baseline signal while photons are prevented from striking the detection device 6, the baseline signal being affected by photons that previously struck the detection device 6, i.e. by photons that struck the detection device 6 at an earlier time or period in time than the time at which the photon is detected by the signal generation unit 20 for which the detection signal indicative of the detected photon's energy is generated. In step 102, a baseline shift determination unit 40 determines a baseline shift of the detection signal depending on the baseline signal. In step 103, an energy determination unit 30 determines the energy of a detected photon depending on the detection signal and the determined baseline shift.

It is noted that these steps are not necessarily executed consecutively in this order. In particular, the baseline shift determination unit 40 can determine the baseline shift of the detection signal (step 102) while the signal generation unit 20 generates a baseline signal (part of step 101), and the energy determination unit 30 can determine the energy of a detected photon (step 103) while the signal generation unit 20 generates a detection signal (part of step 101).

FIG. 3 shows schematically and exemplarily an embodiment of an imaging system, the imaging system being, in this embodiment, a computed tomography (CT) system. The computed tomography system comprises a gantry 1, which is capable of rotating around an axis of rotation R, which extends parallel to the z axis. A radiation source 2, for example, an X-ray tube, is mounted on the gantry 1. The radiation source 2 is provided with a collimator 3, which forms, in this embodiment, a conical radiation beam 4 from the radiation emitted by the radiation source 2. In other embodiments, the collimator 3 can be adapted to form a radiation beam having another shape, for example, a fan shape.

The radiation beam 4 traverses an object (not shown), such as a patient or a technical object, within a region of interest in a cylindrical examination zone 5. After having traversed the region of interest, the radiation is incident on a detection device 6, which is also mounted on the gantry 1. In this embodiment, the detection device 6 is a photon counting detection device as described with reference to FIG. 1. In this example, the detection device 6 has a two-dimensional detection surface comprising a plurality of pixels; in other embodiments, it can also have a one-dimensional detection surface.

The gantry 1 is driven at a preferably constant but adjustable angular speed by a motor 7. A further motor 8 is provided for displacing the object, for example, a patient who is arranged on a patient table in the examination zone 5, parallel to the direction of the axis of rotation R or the z axis. These motors 7, 8 are controlled by a control unit 9, for instance, such that the radiation source 2 and the examination zone 5, in particular, the region of interest, move relatively to each other along a helical trajectory. However, it is also possible that the object or the examination zone 5, in particular, the region of interest, is not moved, but that only the radiation source 2 is rotated, in which case the radiation source 2 moves relative to the examination zone 5, in particular, the region of interest, along a circular trajectory.

During the relative movement of the radiation source 2 and the examination zone 5, in particular, the region of interest, the detection device 6 generates measurement values depending on the radiation incident on the detection surface of the detection device 6. Therefore, the radiation source 2, the elements for moving the radiation source 2 relative to the examination zone 5, in particular, the motors 7, 8, the gantry 1, the control unit 9, and the detection device 6 form a measured data providing unit for providing measured data of the region of interest.

The measured data of the region of interest, which are, in this embodiment, measured photon counts, are provided to a reconstruction unit 10, which reconstructs an image of the region of interest. The reconstructed image is displayed on a display 18.

The computed tomography system comprises a sychronization unit 11 for synchronizing the detection device 6 with the irradiation by the radiation source 2 such that the baseline shift determination unit 40 of the detection device 6 determines the baseline shift during a baseline shift determination time interval during which the radiation source 2 is prevented from irradiating the detection device 6. The synchronizability of the detection device 6 is realized, in this embodiment, by a suitable interface, such as an analog or digital interface, that allows to provide a suitable sychronization signal SYNC to the detection device 6.

In this embodiment, the radiation source 2 comprises a switching device 12 for switching the emission of photons on and off and the synchronization unit 11 is adapted to provide a synchronization signal SYNC to the switching device 12 such that during the baseline shift determination time interval the switching device 12 is signaled to switch the emission of photons off. The switching device is preferably a grid switch, which for an X-ray tube may comprise an extra electrode located between the X-ray tube's cathode and anode to control the flow of electrons.

Figure 4:
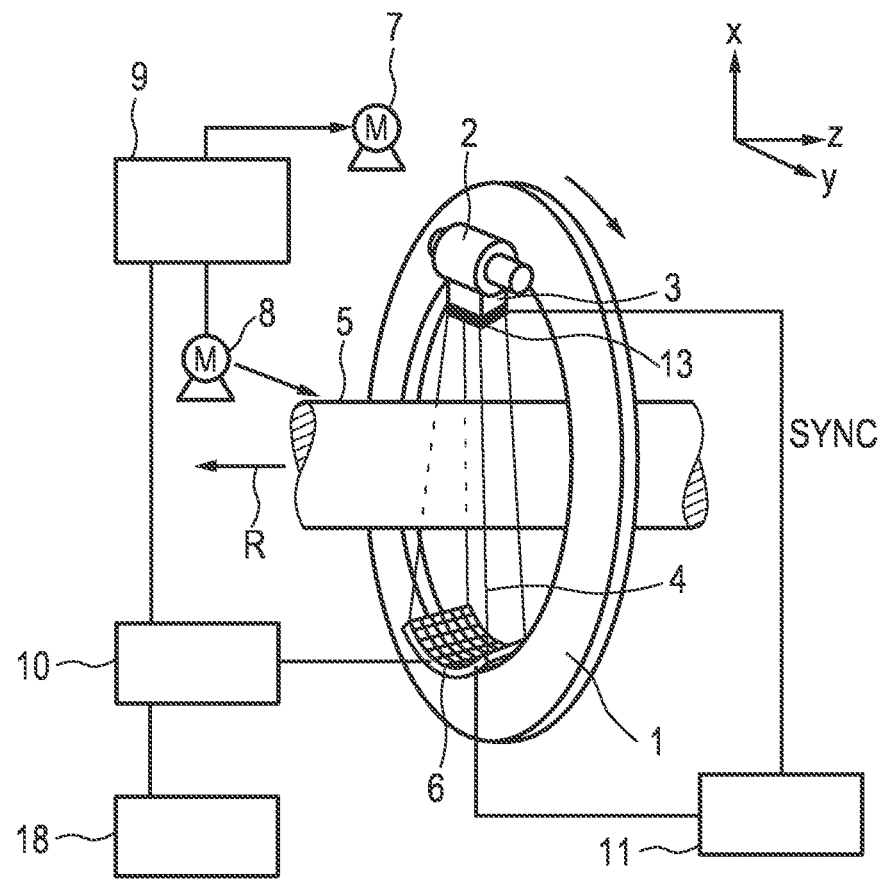
FIG. 4 shows schematically and exemplarily another embodiment of an imaging system.

FIG. 4 shows schematically and exemplarily another embodiment of an imaging system. The imaging system of this embodiment differs from the imaging system as described with reference to FIG. 3 in that the radiation source 2 does not comprise a switching device 12 for switching the emission of photons on and off. Instead, the imaging system comprises a shielding device 13 for shielding the radiation source 2. The synchronization unit 11, in this case, is adapted to provide a synchronization signal SYNC to the shielding device 13 such that during the baseline shift determination time interval the shielding device 13 is signaled to shield the radiation source from irradiating the detection device 2.

A shielding device 13 is preferably used with radiation sources that do not allow for an active control of the photon emission, such as a gamma emitting radionuclide or a positron emitting radionuclide, but it may also be used with an X-ray tube or the like. The shielding device is preferably a switched piece of metal or other material that is impermeable for the photons emitted by the radiation source.

Figure 5:
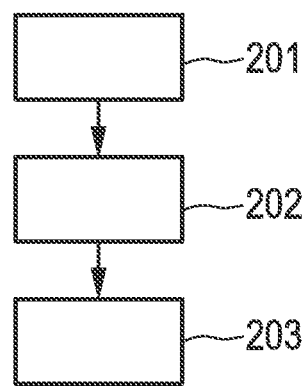
FIG. 5 shows exemplarily a flowchart illustrating an embodiment of an imaging method.

FIG. 5 shows exemplarily a flowchart illustrating an embodiment of an imaging method. In step 201, a radiation source 2 emits photons. In step 202, a detection method as described with reference to FIG. 2 detects photons emitted by the radiation source 2. In step 203, a synchronization unit 11 synchronizes the detection device 6 with the irradiation by the radiation source 2 such that the baseline shift determination unit 40 determines the baseline shift during a baseline shift determination time interval during which the radiation source 2 is prevented from irradiating the detection device 6.

It is noted that these steps are not necessarily executed consecutively in this order. In particular, if the radiation source 2 comprises a switching device 12 for switching the emission of photons on and off and the synchronization unit 11 is adapted to provide a synchronization signal SYNC to the switching device 12 such that during the baseline shift determination time interval the switching device 12 is signaled to switch the emission of photons off, the radiation source 2 may not emit photons (step 201) during the baseline shift determination time interval.

Other variations of the disclosed embodiments can be understood and effected by those skilled in the art in practicing the claimed invention from a study of the drawings, the disclosure and the appended claims.

In the claims, the word "comprising" does not exclude other elements or steps and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference sign in the claims should not be construed as limiting the scope.

The invention relates to a detection device for detecting photons emitted by a radiation source. A signal generation unit generates a detection signal indicative of the energy of a detected photon while photons strike the detection device, and a baseline signal, which is affected by photons that previously struck the detection device, while photons are prevented from striking the detection device. A baseline shift determination unit determines a baseline shift of the detection signal depending on the baseline signal. An energy determination unit determines the energy of a detected photon depending on the detection signal and the determined baseline shift. Since the baseline shift of the detection signal is determined from a baseline signal that is generated while photons are prevented from striking the detection device, the baseline shift can be determined with higher accuracy, resulting in an improved energy determination.

The invention claimed is:

1. A detection device for detecting photons emitted by an x-ray radiation source, the detection device comprising:
    a signal generation unit that generates a detection signal indicative of the energy of a detected x-ray photon while x-ray photons strike the detection device, wherein the signal generation unit generates a baseline signal while x-ray photons are prevented from striking the detection device, the baseline signal being affected by x-ray photons that previously struck the detection device,
    a baseline shift determination unit that determines a baseline shift of the detection signal, wherein the baseline shift determination unit determines the baseline shift depending on the baseline signal,
    an energy determination unit that determines the energy of the detected x-ray photon depending on the detection signal and the determined baseline shift.

2. The detection device according to claim 1, wherein the detection device is adapted to be synchronizable with the irradiation by the x-ray radiation source such that the baseline shift determination unit determines the baseline shift during a baseline shift determination time interval during which the x-ray radiation source is prevented from irradiating the detection device.

3. The detection device according to claim 2, wherein the detection device is adapted to be synchronizable with the irradiation by the x-ray radiation source such that the baseline shift determination time interval is located at the end of a frame period.

4. The detection device according to claim 2, wherein the detection device is adapted to be synchronizable with the irradiation by the x-ray radiation source such that during a frame period the baseline shift determination unit determines the baseline shift during multiple baseline shift determination time intervals during which the x-ray radiation source is prevented from irradiating the detection device.

5. The detection device according to claim 2, wherein the detection device is adapted to be synchronizable with the irradiation by the x-ray radiation source such that the baseline shift measuring time interval is started when a flux of x-ray photons striking the detection device exceeds a predefined threshold.

6. The detection device according to claim 1, wherein the energy determination unit is adapted to correct the energy determination with respect to the determined baseline shift by removing the determined baseline shift from the detection signal.

7. The detection device of claim 6, wherein the signal generation unit generates an additional fixed signal offset that is independent from the irradiation of the detection device and that is in both the detection signal and the baseline signal.

8. The detection device according to claim 1, wherein the energy determination unit is adapted to determine the energy of the detected x-ray photon by comparing the detection signal to one or more energy comparison values to which the determined baseline shift has been added in order to correct the energy determination with respect to the determined baseline shift.

9. The detection device according to claim 1, wherein the baseline shift determination unit comprises a sampling unit for sampling the baseline signal to generate a sampled value and an analog-to-digital converter unit for converting the sampled value to a digital value.

10. The detection device according to claim 1, wherein the detection device comprises a plurality of pixels, each pixel comprising the signal generation unit and the baseline shift determining unit, wherein for each pixel the baseline shift determination unit comprises a sampling unit for sampling the baseline signal to generate a sampled value, wherein the detection device comprises an analog-to-digital converter unit that is assigned to the sampling units of multiple pixels for sequentially converting the sampled values to digital values.

11. The detection device of claim 1, wherein the signal generation unit includes an integrating amplifier comprising an operational amplifier and a feedback capacitor with a resistor connected in parallel to the feedback capacitor, wherein the integrating amplifier integrates.

12. The detection device of claim 1, wherein the signal generation unit includes two stages, a first charge sensitive amplifier and a second stage implementing pulse shaping functionality.

13. The detection device of claim 1, further comprising:
    a cadmium zinc telluride radiation sensitive sensor that detects the x-ray photon and produces an electrical current signal, wherein the signal generation unit integrates the electrical current signal, producing the detection signal, which includes a detection pulse signal having an amplitude that is indicative of the energy of the detected x-ray photon.

14. A detection method for detecting photons emitted by an x-ray radiation source by a detection device, the detection method comprising:

generating a detection signal indicative of the energy of a detected x-ray photon while x-ray photons strike the detection device and a baseline signal while x-ray photons are prevented from striking the detection device, the baseline signal being affected by x-ray photons that previously struck the detection device, by a signal generation unit, determining a baseline shift of the detection signal depending on the baseline signal, by a baseline shift determination unit, determining the energy of the detected x-ray photon depending on the detection signal and the determined baseline shift, by an energy determination unit.

15. An imaging method, the imaging method comprising:
emitting photons, by a radiation source, wherein the radiation source is an X-ray tube,
detecting photons emitted by the radiation source, by a detection method as defined in claim 10, and
synchronizing the detection device with the irradiation by the radiation source such that the baseline shift determination unit determines the baseline shift during a baseline shift determination time interval during which the radiation source is prevented from irradiating the detection device, by a synchronization unit.

16. A computed tomography imaging system, the imaging system comprising:

a rotating gantry configured to rotate about a rotation axis;
a radiation source for emitting x-ray photons, wherein the radiation source is affixed to and rotates with the rotating gantry,
a photon counting detection device for detecting individual x-ray photons emitted by the radiation source, and
a synchronization unit for synchronizing the detection device with the irradiation by the radiation source such that the baseline shift determination unit determines the baseline shift during a baseline shift determination time interval during which the radiation source is prevented from irradiating the detection device with the emitted x-ray photons.

17. The imaging system of claim 16, wherein the radiation source comprises a switching device for switching the emission of photons on and off, wherein the synchronization unit is adapted to provide a synchronization signal (SYNC) to the switching device such that during the baseline shift determination time interval the switching device is signaled to switch the emission of x-ray photons off.

18. The imaging system of claim 16, wherein the imaging system comprises a shielding device for shielding the radiation source, wherein the synchronization unit is adapted to provide a synchronization signal (SYNC) to the shielding device such that during the baseline shift determination time interval the shielding device is signaled to shield the radiation source from irradiating the detection device with emitted x-ray photons.

* * * * *